March 26, 1957  A. E. HAMMER  2,786,517
TIRE BEAD LOOSENING JACK
Filed Oct. 17, 1955
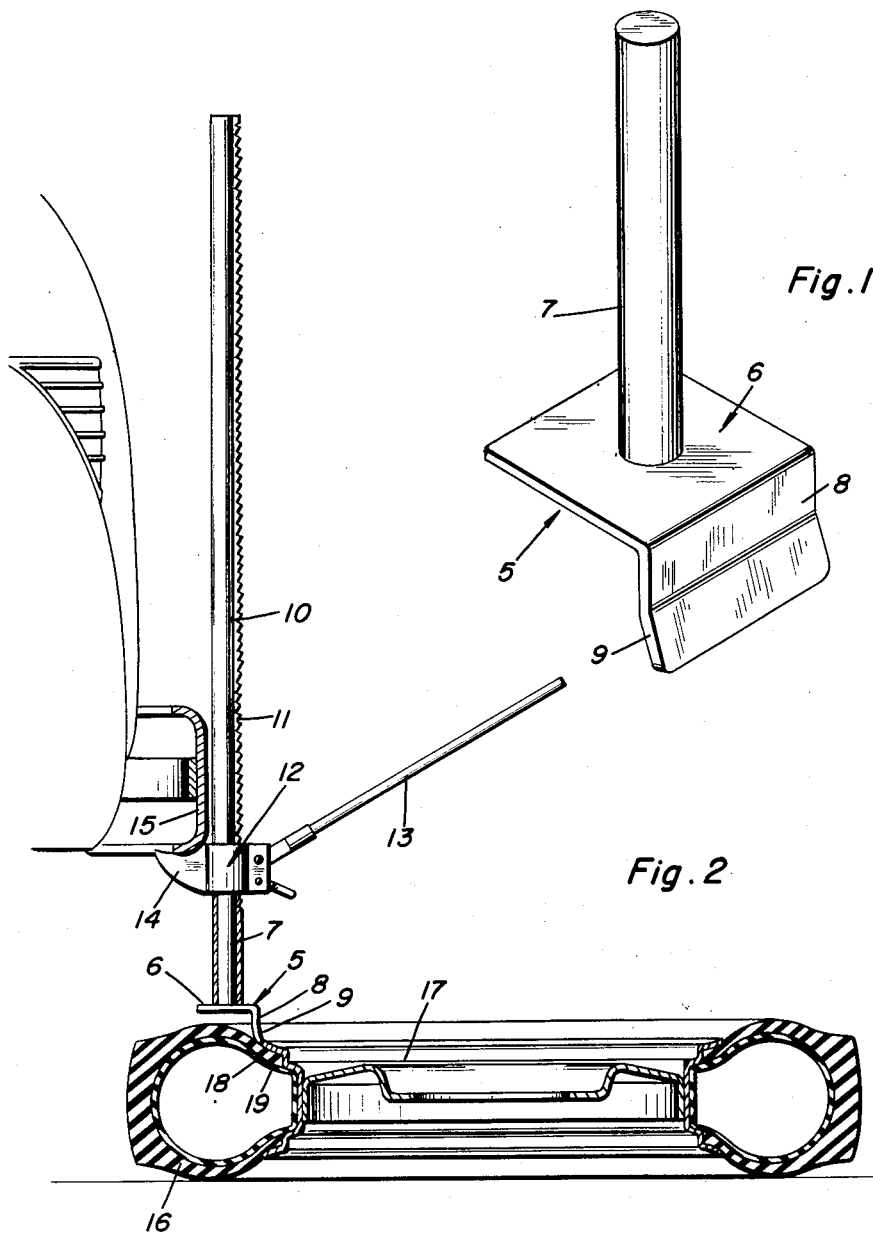
Alfred E. Hammer
INVENTOR.

United States Patent Office 2,786,517
Patented Mar. 26, 1957

2,786,517
TIRE BEAD LOOSENING JACK
Alfred E. Hammer, Trenton, N. Dak.

Application October 17, 1955, Serial No. 540,730

1 Claim. (Cl. 157—1.17)

The present invention relates to new and useful improvements in tire tools and more particularly to a novel jack mechanism for loosening pneumatic tire casings from the flanged wheel rims on which they are mounted.

An important object of the invention is to provide a vehicle jack base designed to rest on the side of a pneumatic tire, when the latter is lying on the ground, and forming the jack base with a downwardly projecting and outwardly curved flange adapted for insertion under the flange of a wheel rim to subject the bead of the tire to downward pressure to free the bead from the rim in order to facilitate removal of the tire casing therefrom.

Another object is to provide a tool of this character of simple and practical construction, which is strong and durable, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the interchangeable jack base; and

Figure 2 is a side elevational view showing the tool in operative position with a pneumatic tire.

Referring now to the drawing in detail, wherein for the purpose of illustration I have disclosed a preferred embodiment of the invention, the numeral 5 designates a jack base which is constructed of a plate 6 having a cylindrical shank 7 integrally formed with the plate or welded or otherwise suitably secured thereto and rising from the center of the plate. A flange 8 projects downwardly from one edge portion of the plate 6 and the lower edge of the flange is formed with an outwardly inclined lip portion 9.

The shank 7 is adapted for interchangeable insertion in the lower end of a tubular jack post 10 which is of a conventional type and formed with rack teeth 11 for engagement by the usual step-by-step jack mechanism designated generally at 12 and which is actuated by a pivoted handle 13 to raise and lower the jack mechanism. The jack mechanism 12 also includes a forwardly projecting support 14 adapted to engage the lower edge of a vehicle bumper 15.

In the operation of the device the usual jack base (not shown) is removed from the lower end of the jack post 10 and the upstanding shank 7 of the tire loosening tool is inserted upwardly in the lower end of the jack post, as shown in Figure 2 of the drawings. A pneumatic tire 16 is shown mounted on a wheel rim 17 and the tire is laid on the ground under the vehicle bumper 15 and with the outwardly projecting lip 9 of the downwardly projecting flange 8 of the tool positioned on top of the tire casing immediately adjacent the upper flange 18 of the wheel rim. The support 14 of the jack mechanism is then engaged under the vehicle bumper 15 and a jacking actuation of the mechanism 12 to raise the support 14 will press the plate 6 downwardly and force the lip 9 under the flange 18 of the wheel rim to loosen the beading 19 of the tire casing from the rim whereupon the casing may be removed from the rim for the purpose of repairing the tire.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A tire tool comprising in combination, a tubular jack post having a vertical row of teeth externally thereof, a jack mechanism operatively mounted on the post and engaging the teeth in a step-by-step movement, said jack mechanism being adapted for engaging under a relatively stationary object to subject the lower end of the post to a downward pressure upon a raising movement of the jack mechanism, and a jack base interchangeably connected to the lower end of the jack post and adapted to rest on top of a horizontally positioned pneumatic tire to free the tire casing from a wheel rim on which the same is mounted, said jack base including a horizontal plate having a shank rising therefrom for insertion upwardly in the lower end of the jack post, said horizontal base plate having a downwardly extending flange on one edge thereof and an outwardly curved tire bead engaging lip on the lower end of said flange to engage the tire casing adjacent the flange of the wheel rim.

References Cited in the file of this patent
UNITED STATES PATENTS

| | | |
|---|---|---|
| 830,479 | Hunefeld et al. | Sept. 4, 1906 |
| 968,474 | Harrah | Aug. 23, 1910 |
| 1,948,434 | Stafford et al. | Feb. 20, 1934 |
| 2,523,448 | Reitz | Sept. 26, 1950 |
| 2,568,874 | Vanleirsberghe | Sept. 25, 1951 |
| 2,691,412 | Wood | Oct. 12, 1954 |